US008502831B2

(12) United States Patent
Dirstine et al.

(10) Patent No.: US 8,502,831 B2
(45) Date of Patent: Aug. 6, 2013

(54) VIDEO MEMORY QUALITY OF SERVICE

(75) Inventors: Adam D. Dirstine, Rochester, MN (US); Steven L. Halter, Rochester, MN (US); David J. Hutchison, Rochester, MN (US); Pamela A. Wright, Rochester, MN (US); Jeffrey M. Ryan, Byron, MN (US)

(73) Assignee: Digi International Inc., Minnetonka, MN (US)

( * ) Notice: Subject to any disclaimer, the term of this patent is extended or adjusted under 35 U.S.C. 154(b) by 1328 days.

(21) Appl. No.: 12/014,654

(22) Filed: Jan. 15, 2008

(65) Prior Publication Data

US 2009/0179908 A1 Jul. 16, 2009

(51) Int. Cl.
*G06F 12/02* (2006.01)
*G06T 1/60* (2006.01)

(52) U.S. Cl.
USPC ........................................... 345/543; 345/530

(58) Field of Classification Search
USPC .................................................. 345/543, 530
See application file for complete search history.

(56) References Cited

U.S. PATENT DOCUMENTS

| | | | | |
|---|---|---|---|---|
| 5,940,076 | A * | 8/1999 | Sommers et al. | 715/834 |
| 6,466,939 | B1 * | 10/2002 | Lai et al. | 1/1 |
| 6,981,027 | B1 * | 12/2005 | Gallo et al. | 709/216 |
| 7,817,900 | B2 * | 10/2010 | Walker | 386/278 |
| 2004/0131267 | A1 * | 7/2004 | Adiletta et al. | 382/236 |
| 2005/0015480 | A1 * | 1/2005 | Foran | 709/224 |

* cited by examiner

*Primary Examiner* — Jacinta M Crawford
(74) *Attorney, Agent, or Firm* — Fogg & Powers LLC

(57) ABSTRACT

Apparatus, methods, and systems are disclosed to manage memory in an embedded system. The system registers video applications and video sources with a memory manager. The memory manager in turn provides memory to the video applications and video sources. The system has an input to receive an output from at least one video source. The memory manager receives a frame from the video source and transfers the frame to memory. Once the frame is in memory the video application may work with the frame. All of these operations are conducted with the memory manager actively managing and allocating the memory resources.

21 Claims, 5 Drawing Sheets

VIDEO MEMORY QUALITY OF SERVICE

BACKGROUND

Video systems utilize video applications, which may be described as components in software that manipulate video, particularly video acquired from a camera. Video applications require large amounts of memory. Video applications manipulate one or more frames of video, often in a way that requires the entire frame or frames to be in memory all at once. Examples include: sending video out via TCP, sending video out via UDP, rendering video on a local display, transcoding to a different video type such as a series of raw images to JPEGs, motion detection, etc. The individual frames may be quite large, so running multiple video applications simultaneously, each holding multiple video frames, results in very high memory usage.

Video applications work with the embedded system to manipulate or utilize information provided from video sources such as cameras. Video applications are best designed to be encapsulated from the details of the video source. This allows for the optimal reusability and extensibility of the video application and the video source software (i.e. the camera driver).

The embedded systems often have a small amount of memory especially when compared to modern PCs. It is a challenge to provide an optimal amount of PC-like features in an embedded device with much less memory than a PC has. For embedded systems there is a wide spectrum of available horsepower and costs for processor speed and the size of available memory. Generally, as cost decreases, horsepower and the available memory decreases. As available memory decreases, supporting video becomes more of a challenge because of the memory requirements of video.

DETAILED DESCRIPTION

Figure 1:
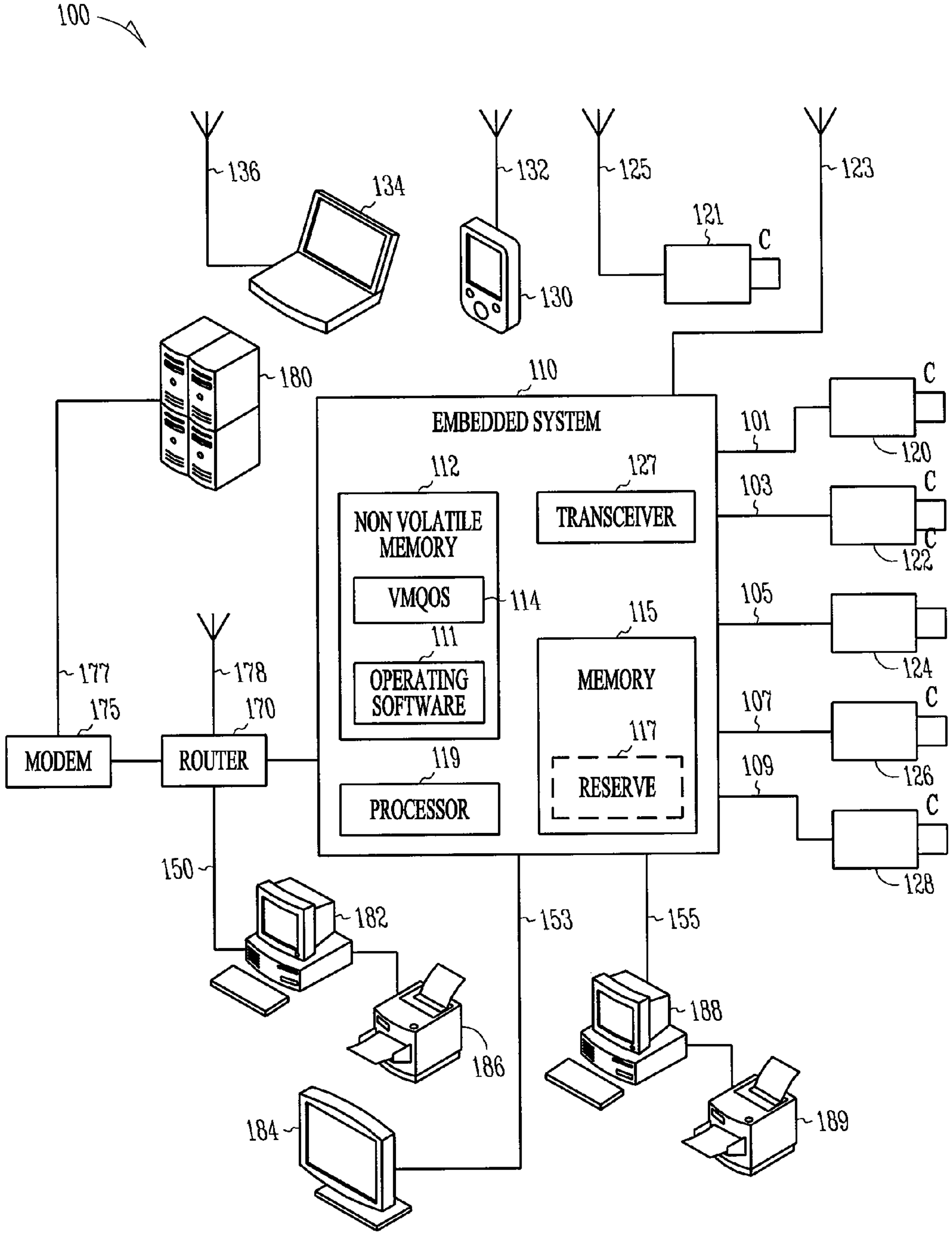
FIG. 1 is a system diagram of an embodiment of the invention.

FIG. 1 is a system diagram of an example embodiment. The system 100 incorporates an embedded system 110 and multiple camera inputs. A plurality of cameras may be connected directly to the embedded system 110 such as by a USB (Universal Serial Bus) connector. The cameras may also be connected wirelessly to the embedded system 110. Cameras 120, 121, 122, 124, 126, and 128 may be connected directly to the embedded system 110. These connections 101, 103, 105, 107, and 109 may be USB connections, Firewire connections, or any compatible connection method. A wireless connection may include an antenna 123 connected to the embedded system 110 via a transceiver 127. A camera 121 may be wirelessly connected to the embedded system 110 by antenna 125, by communicating with the embedded system 110 through antenna 123, or through a router 170, which may be wirelessly enabled and have an antenna 178.

Embedded system 110 is enabled to accept from cameras 120, 121, 122, 124, 126, and 128 video in a format such as JPEG. JPEG is a commonly used method of compression for photographic images. The name JPEG stands for Joint Photographic Experts Group, the name of the committee that created the standard. While the specification shall discuss the operation utilizing the JPEG format, other formats of video capture may be utilized with the embodiments of the invention.

Embedded system 110 may be connected to peripherals, a network such as an Ethernet network, or the internet 177 via the router 170 and/or a modem 175. Modem 175 may be connected to a server 180 through the internet 177. The embedded system 110 may be connected to a personal computer 182 via an Ethernet connection 150. Personal computer 182 may also be connected to a printer 186. Embedded system 110 may also be connected to a monitor 184. Monitor 184 may be connected as shown directly to the embedded system 110 through a USB connection 153 or through an Ethernet connection (not shown) via router 170. A personal computer 188 may also be connected directly to embedded system 110 via a USB connection 155. Personal computer 188 may also be connected to a printer 189.

The embedded system 110 may communicate with peripherals via wireless connections. For example, embedded system 110 may communicate to a personal computer 134 having an antenna 136 via antenna 123 connected to transceiver 127 or antenna 178 through router 170. Additionally, a PDA 130 (personal digital assistant) having an antenna 132 may be connected wirelessly to embedded system 110 via antenna 123 or antenna 178. The wireless connections may utilize a Wi-Fi, infrared, or other wireless connection means. Wi-Fi refers to a family of related specifications (the IEEE 802.11 group (Institute of Electrical and Electronics Engineers)), which specify methods and techniques of wireless local area network operation. It is understood that other wireless connection methods may be utilized, provided the wireless connection method provides at least one-way communication either to or from the embedded system 110 to the wireless device.

Embedded system 110 may incorporate memory 115 (such as RAM, random access memory) to receive the direct line inputs from one or more cameras 120, 121, 122, 124, 126, or 128. Embedded system 110 may also incorporate a processor 119 and operating software 111. The operating software 111 may be stored in non-volatile memory 112 and may be stored either in the non-volatile memory 112 or in the memory 115 for execution. Non-volatile memory 112 may be a hard drive, flash memory, or other non-volatile memory. Video Management Quality of Service 114 software (VMQOS) may also be stored in non-volatile memory 112. VMOQS may be moved to volatile memory for execution or operated from non-volatile memory 112. VMQOS 114 software may specify that a memory reserve 117 be allocated in RAM 115 to receive video inputs from cameras 120, 121, 122, 124, 126, and/or 128 or for software applications that may be stored in non-volatile memory 112. The size of the specified memory reserve 117 may be set by VMQOS 114, VMQOS may receive inputs from a user through one of the peripheral devices, or by an API from a camera or other device. An application programming interface (API) is a software interface that a computer application, operating system, or library provides to support requests for services to be made of it by a computer program. The memory reserve 117 size may not be a fixed size and may vary based upon the operation and requirements of the embedded system 110. In addition to specifying the volatile memory 115 allocations for incoming video, VMQOS may also specify the amount of memory available for embedded software in the embedded system 110.

Figure 2:
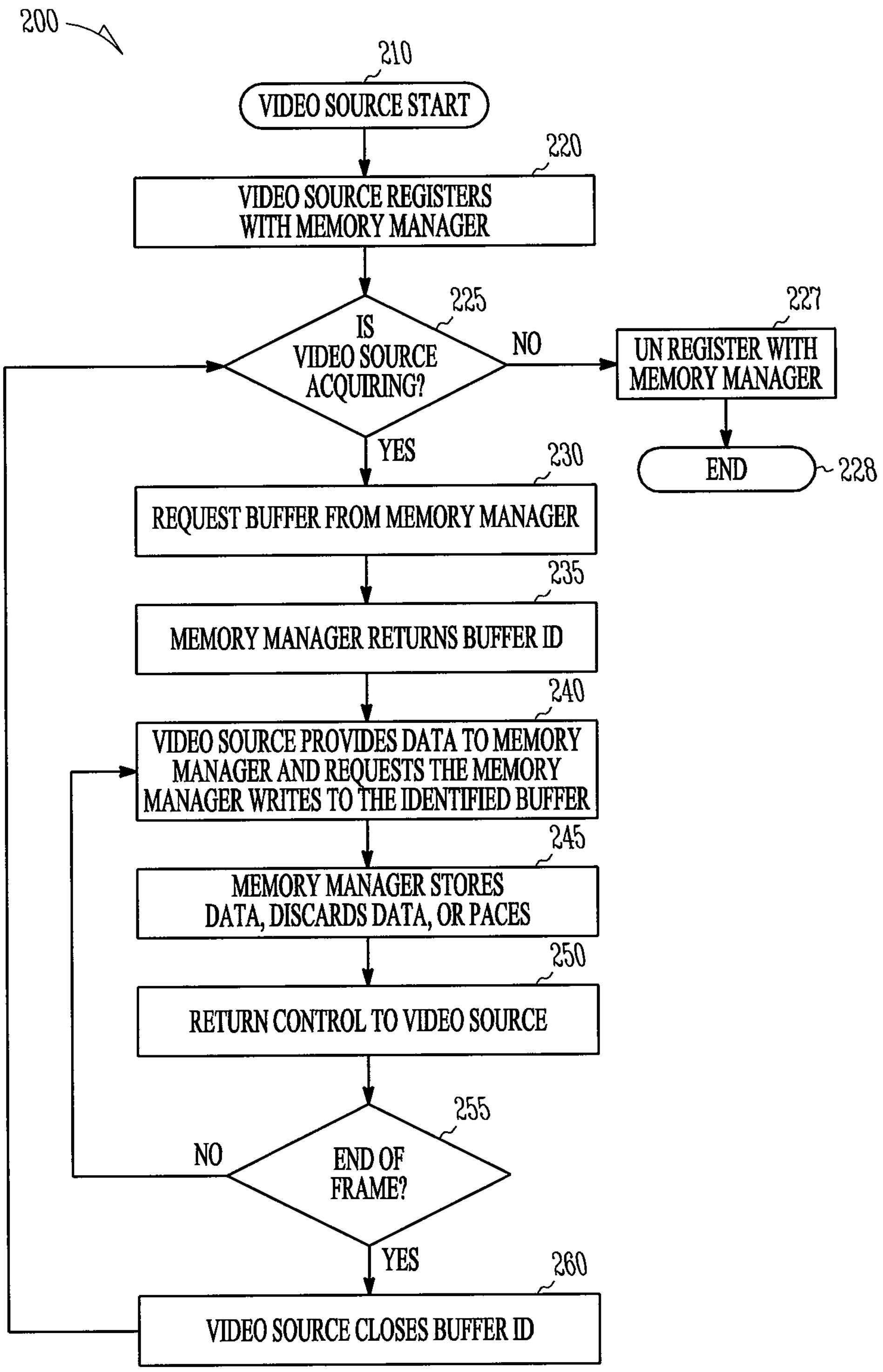
FIG. 2 is a flow chart of a method for managing buffers for inputs from video sources according to an example embodiment.

FIG. 2 is a flow chart of a method for managing buffers for inputs from video sources according to an example embodiment. Method 200 may include activity 210 to start the video source. The video source may be a camera such as camera 120, 121, 122, 123, 124, 126, or 128 of FIG. 1. Activity 220 may be to have the video source register with the memory manager. As stated earlier, the video source may register with an API to define the memory requirements of the video source. Activity 225 may be to determine if the video source is acquiring video. If the video source is not acquiring data, activity 227 may unregister the video source with the memory manager and activity 228 stops activity by the memory manager for that video source. If the video source is acquiring video activity 230 is to have the video source request buffer or memory from the memory manager. Activity 230 the video source informs the memory manager how much buffer the video source would like to have. The memory manager operates the VMQOS 114 software of FIG. 1 to determine how much memory should be allocated to the video source. Activity 235 may be to have the memory manager return a buffer ID (identification) to the video source. Activity 240 may be for the video source to provide data to memory manager and request that the memory manager write the data to the identified buffer. Activity 245 may be for the memory manager to write the data to the buffer identified, discard the data or pace. Pace means the memory manager determines that memory may not be available at that time and the memory manager will delay the video source until the memory manager determines there is space available. Activity 250 may be to return control of the function to the video source. Activity 255 may be for the video source to determine if the end of the frame has been reached. If the end of the end of the frame has not been reached the process returns to activity 240. If the end of frame has been reached, activity 260 may be to have the video source close the buffer ID. Activity 225 is then initiated to determine if the video source continues to acquire.

Figure 3:
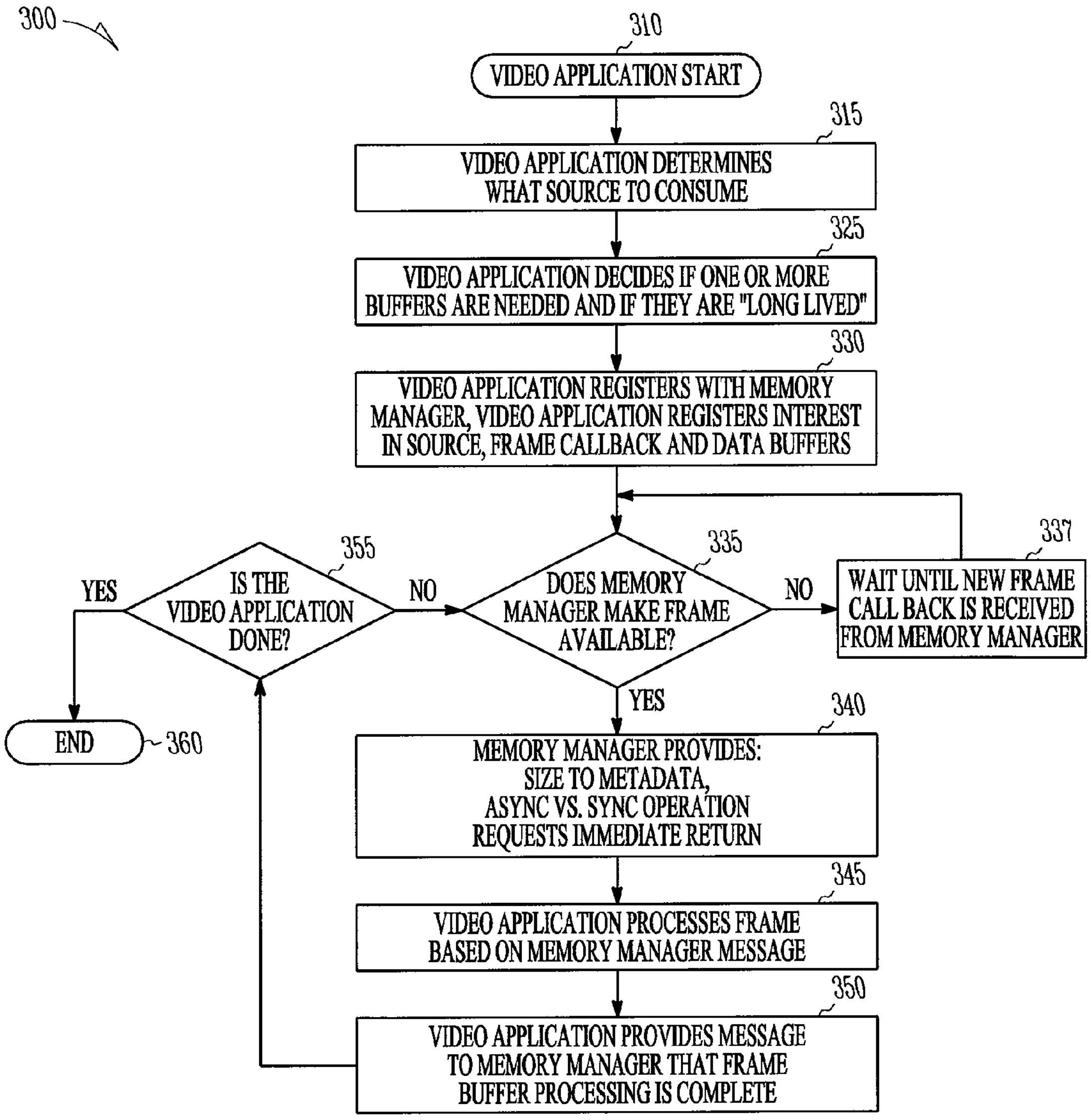
FIG. 3 is a flow chart for the video application's interaction with the memory manager according to an example embodiment.

FIG. 3 is a flow chart for the video application's interaction with the memory manager according to an example embodiment. The method 300 operates to allocate memory for video applications. Activity 310 may be to start the video application. Activity 315 may include having the video application determine what source the application will consume. Activity 325 may be to have the video application decide if one or more buffers are needed and if the buffers are to be "long lived". A "long lived" buffer is one that may need to be available for an extended period of time as determined by the video application. If the video frame is needed for a longer time than the frame period, the video application will need a long lived buffer. The frame period is the inverse of the frame rate and is the amount of elapsed time between frames. Activity 330 may be to have the video application register with the memory manager. The video application may register interest in a video source as defined in activity 315, and may request that that when a new frame is available that the video application be notified via a frame callback. A frame callback is a message originating from the memory manager to the video application indicating a new video frame is available. Activity 335 may be for the message manager to determine if it will make a frame available. If a frame is not made available activity 337 may be to wait until a new frame call back is received from the memory manager. When a frame is available the memory manager to provide a message to the video application (a new frame callback message) indicating a new frame is available. Activity 340 may be for the memory manager to provide additional information to the video application such as the size of the frame, location of the frame and whether it is asynchronous or synchronous. An asynchronous versus synchronous determination indicates to the video application whether or not the memory manager will wait on the video application before continuing its work with that video frame. Synchronous indicates the memory manager will wait for the video application to complete its work and asynchronous indicates that the memory manager will continue to process that frame independent of what the video application does. In addition the memory manager may request immediate return which is a way for the memory manager to indicate to the video application that the video application must complete work with that frame as quickly as possible. This indicator may be used by the video application as a signal to skip this frame if the video application knows it cannot be processed quickly or the video application may take whatever other action it determines in order to return a complete message to the memory manager. Activity 345 may include having the video application process the frame based on the memory manager message of activity 340. Activity 350 may be to have the video application provide a message to the memory manager that the frame buffer processing is complete. When activity 350 is completed activity 355 may be to determine if the video application is done. If the application is not done, activity 335 may repeated for the next frame. If the application is done, activity 360 will be for the video application to unregister with the memory manager.

Figure 4:
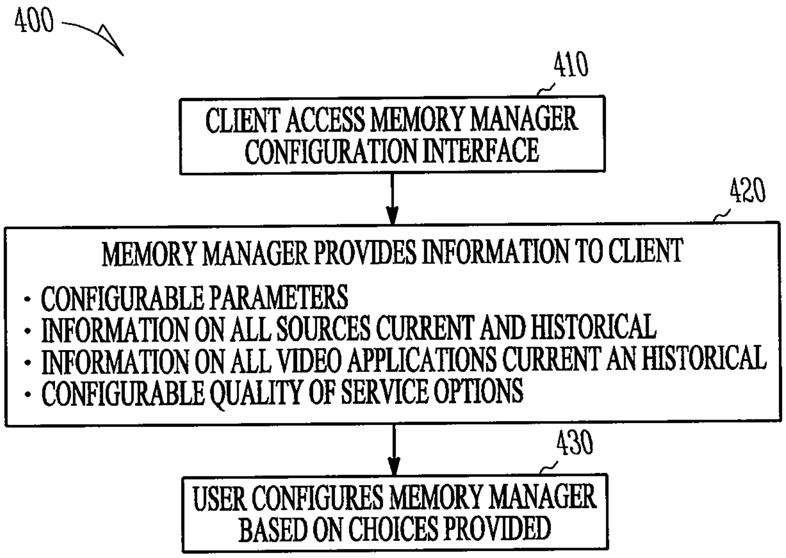
FIG. 4 is a flowchart for a method for configuring a memory manager according to an example embodiment.

FIG. 4 is a flowchart for a method for configuring a memory manager according to an embodiment of the invention. Method 400 may be to begin with activity 410 initiated by the client accessing the memory manager configuration interface. This may be a user interface available, for example, on personal computer 182 or 188 of FIG. 1. Activity 420 may include having the memory manager provide information to the client. This information may include the configurable parameters, information on all sources that are currently available and have been historically available. The information provided may also include information on all video applications currently and historically available for use. Finally, the user interface may include configurable quality of service options. The quality of service options may determine for example the resolution of video frames, prioritize video sources and video applications. For example, if a door is opened it may make the video source monitoring that door the priority based on preferences set by the user. Activity 430 may be to have the user configure the memory manager based on choices that were made available to the user.

Figure 5:
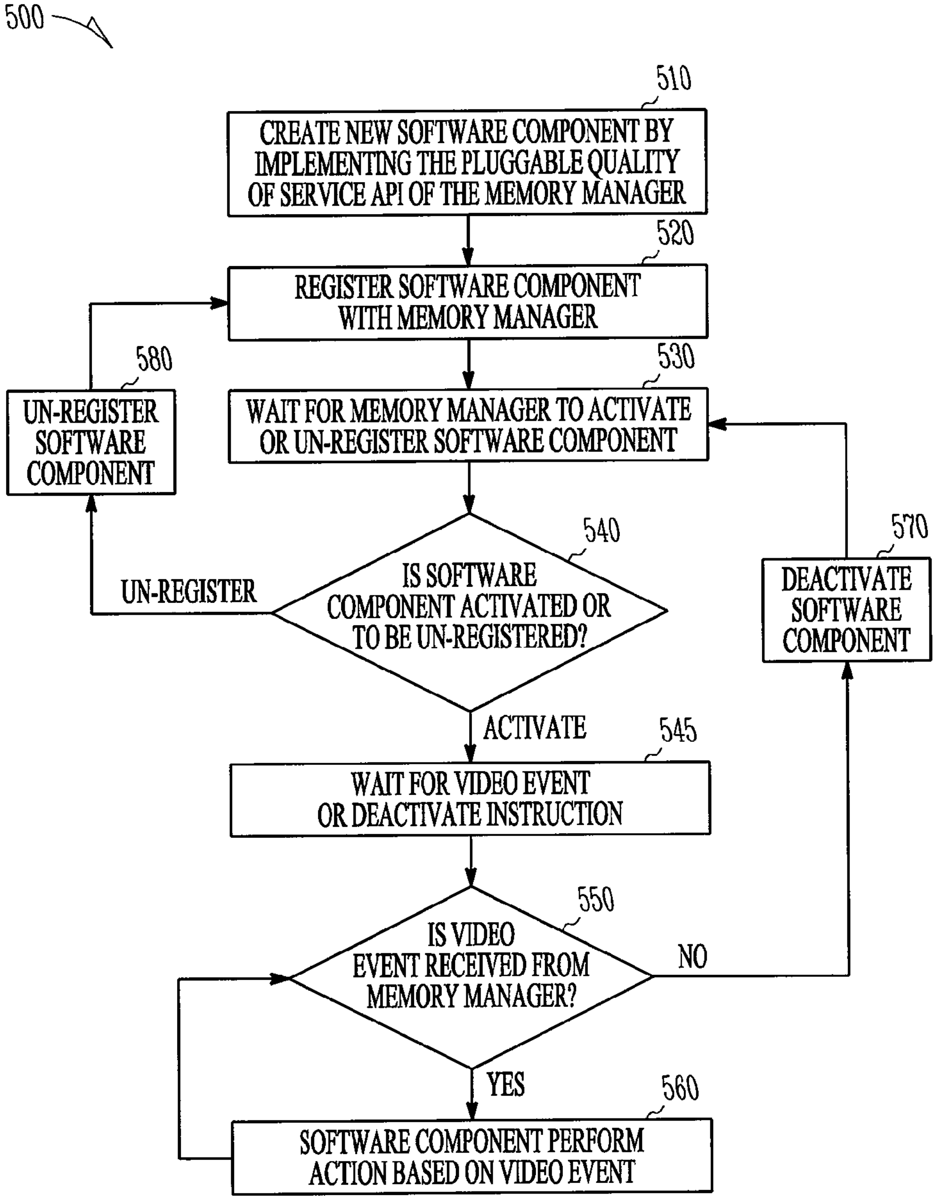
FIG. 5 is a flowchart for a method for utilizing a software component to adding new memory manager qualities of service dynamically according to an example embodiment.

FIG. 5 is a flowchart for a method for utilizing a software component to adding new memory manager qualities of service dynamically according to an example embodiment. A software component may be written that conforms to the pluggable quality of service API of the memory manager. The new software component becomes selectable by a user (or any agent capable of configuring the system). The API allows the memory manager to delegate memory usage decisions to the new software component when it is activated. The activated software component will be notified by the memory manager about video events. Based on the video events, the activated software component will configure the memory manager, video sources and video applications to affect their behavior as programmed in the software component.

Method 500 describes the operation of a new pluggable quality of service software component. Activity 510 may be to create a new software component by implementing the pluggable quality of service API of the memory manager and by exposing configuration information. Activity 520 may be to register the new software component with the memory manager. By registering the memory manager is made aware of the new software component. Activity 530 may be for the new software component to wait for the memory manager to either activate the software component or to un-register the software component. Activity 540 may be to determine if software component has been activated or un-registered. If it has been activated, activity 545 may be to wait until either a video event is provided by the memory manager or a deactivation instruction is provided by the memory manager. Activity 550 may determine if the software component has received a video event from the memory manager. If a video event has been received, activity 560 may be for the software component to perform an action based on the video event. The action performed in activity 560 may be that the software component modifies the configuration of the memory manager, any video sources, and/or video applications. The video event, may be for example that a new frame is available from a video source, or a video application has requested a long lived buffer, or a video application has freed a long lived buffer.

If activity 550 determines that a video event has not been provided in activity 545, but a deactivate command has been received, activity 570 may be to deactivate the software component. Once the software component is deactivated activity 530 is repeated.

If activity 540 determines the software component was to be unregistered, activity 580 may be to un-register the software component and perform any cleanup of resources the software component needs to, as determined by the software component activity. If the system or user determines that the software component needs to be used again, it may be registered in activity 520.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. The above description and figures illustrate embodiments of the invention to enable those skilled in the art to practice the embodiments of the invention. Thus the following claims are hereby incorporated into the Detailed Description, with each claim standing on its own as a separate embodiment.

What is claimed is:

1. A method comprising:

registering a video source with a memory manager, wherein a video source is configured to capture video and generate video data for use by one or more video applications;

requesting, by the video source, a buffer from the memory manager;

providing data from the video source to the memory manager;

writing data to the buffer from the memory manager; and closing the buffer with the video source.

2. The method of claim 1, further comprising:

the memory manager writing the data to the buffer, discarding the data or pacing.

3. The method of claim 1, further comprising:

providing a buffer identity for an identified buffer from the memory manager to the video source.

4. The method of claim 3, further comprising:

the memory manager writing the data to the identified buffer, discarding the data or pacing.

5. The method of claim 4, further comprising:

determining if the video source is acquiring data.

6. The method of claim 5, further comprising:

determining if an end of a frame has been reached, wherein the video source closed the identified buffer.

7. The method of claim 6, further comprising:

if the video source is not acquiring data, un-registering the video source with the memory manager.

8. A method comprising:

registering a video application with a memory manager, wherein the registering includes the video application providing memory requirements and indicating a video source of the video data, wherein a video source is configured to capture video and generate video data for use by one or more video applications; and allocating, by the memory manager, a frame to the video application when a frame meeting the memory requirements is available; wherein allocating includes allocating a frame according to user-configurable allocation parameters of the memory manager and providing a characterization of the allocated frame.

9. The method of claim 8, wherein the memory requirements are at least one of a processing time, buffer requirements, and a desired source.

10. The method of claim 9, wherein the characterization may include one of size of the frame, immediate return requests, synchronization information, and buffer location.

11. The method of claim 10, further comprising:

processing the allocated frame by the video application.

12. An apparatus comprising:

an input to receive an output from at least one video source, wherein a video source is configured to capture video and generate video data for use by one or more video applications;

a memory, the memory having a maximum memory reserve size; and a memory manager adapted to:

receive a registration from a video source;

determine how much memory to allocate to the video source when the video source is active; and receive a frame from the at least one video source, wherein the memory manager determines whether to transfer the frame to memory, drop the frame or pace according to the memory reserve size.

13. The apparatus of claim 12, wherein the memory manager provides a buffer identity to the video source, the video source providing the buffer identity to the memory manager with the frame.

14. The apparatus of claim 12, further comprising a connection to send and receive data from a user interface, the user interface for setting configurable parameters for the memory manager.

15. The apparatus of claim 14, wherein the memory manager is configured to send via the user interface an indication of applications available for use.

16. The apparatus of claim 15, further comprising a video application, the video application registering with the memory manager.

17. The apparatus of claim 16, further comprising a display for displaying the frame.

18. The apparatus of claim 16, further comprising a remote computer to store the frame.

19. The apparatus of claim 12, further comprising a video application, the video application registering with the memory manager.

20. A method comprising:

registering a software component of a memory manager with the memory manager;

waiting for the memory manager to activate the software component, wherein the memory manager delegates a memory usage decision to the activated software component in response to the registering;

the memory manager notifying the software component of a video event; and the software component performing an action based on the video event.

21. The method of claim 20, further comprising the memory manager deactivating the software component.

* * * * *